United States Patent
Sanders

(10) Patent No.: US 8,577,896 B2
(45) Date of Patent: Nov. 5, 2013

(54) INTEREST BASED ROW SELECTION

(75) Inventor: Jonathan Michael Sanders, Los Gatos, CA (US)

(73) Assignee: Netflix, Inc, Los Gatos, CA (US)

( * ) Notice: Subject to any disclaimer, the term of this patent is extended or adjusted under 35 U.S.C. 154(b) by 116 days.

(21) Appl. No.: 12/796,468

(22) Filed: Jun. 8, 2010

(65) Prior Publication Data

US 2011/0302158 A1 Dec. 8, 2011

(51) Int. Cl.
*G06F 17/30* (2006.01)

(52) U.S. Cl.
USPC ............................ 707/748; 707/755; 707/758

(58) Field of Classification Search
None
See application file for complete search history.

(56) References Cited

U.S. PATENT DOCUMENTS

| | | |
|---|---|---|
| 2003/0014407 A1 | 1/2003 | Blatter et al. |
| 2003/0237093 A1 | 12/2003 | Marsh |
| 2006/0167942 A1 * | 7/2006 | Lucas et al. ................ 707/104.1 |
| 2006/0263041 A1 * | 11/2006 | Gustta ............................. 386/83 |
| 2007/0039023 A1 * | 2/2007 | Kataoka .......................... 725/46 |
| 2009/0210475 A1 * | 8/2009 | Gadanho et al. .............. 709/201 |
| 2009/0234784 A1 | 9/2009 | Buriano et al. |
| 2009/0259621 A1 * | 10/2009 | Svendsen et al. ................. 707/3 |
| 2009/0276729 A1 * | 11/2009 | Cantu-Paz .................... 715/811 |
| 2010/0031162 A1 * | 2/2010 | Wiser et al. .................... 715/747 |
| 2010/0050211 A1 | 2/2010 | Seldin et al. |
| 2011/0047568 A1 * | 2/2011 | Yeh et al. ........................ 725/38 |

OTHER PUBLICATIONS

International Search Report and Written Opinion for PCT Application No. PCT/US2011/039193 dated Nov. 15, 2011.

* cited by examiner

*Primary Examiner* — Son T Hoang

(74) *Attorney, Agent, or Firm* — Patterson & Sheridan, LLP

(57) ABSTRACT

Genres and associated digital items are recommended to a user based on the interests of the user. Genres that are of interest to the user are determined based on user preferences gathered implicitly or explicitly. The genres are then scored and sorted based on different scoring and sorting techniques. A subset of the scored and sorted genres is then selected for recommending to the user.

18 Claims, 4 Drawing Sheets

INTEREST BASED ROW SELECTION

BACKGROUND OF THE INVENTION

1. Field of the Invention

The present invention relates generally to online commerce and, more specifically, to interest based row selection.

2. Description of the Related Art

Conventional digital content distribution systems usually include a content server, an application, a content player, and a communications network connecting the content server to the content player. The content server is configured to store digital content files corresponding to different content titles that can be downloaded from the content server to the content player. The application allows a user of the content player to browse through available digital content and manage account information, etc.

Typical digital content distribution systems offer a large variety of digital media to the user for viewing. In order to enhance the user experience, content distribution systems often personalize digital media recommendations to the individual user. One approach to recommending digital media involves determining digital media of interest to the individual user based on the preferences of similar users. One drawback to this approach, however, is that a large amount of data needs to be stored and managed in order to determine similar users making such an approach is inappropriate in some situations.

As the foregoing illustrates, what is needed in the art is a more efficient mechanism for recommending digital content to a user based on individual user preferences.

SUMMARY OF THE INVENTION

One embodiment of the present invention sets forth a method for recommending one or more alternate genres of digital items to a user. The method comprises the steps of receiving one or more user preferences that reflect at least one attribute associated with one or more digital content items, determining at least one preference tag based on the one or more attributes, wherein the at least one preference tag comprises metadata reflective of one or more attributes, identifying one or more genres included within a set of genres reflective of the one or more user preferences by comparing, for each genre, the at least one preference tag to one or more metadata tags defining the genre and determining that the at least one preference tag matches one of the one or more metadata tags. The method further comprises the steps of, for each genre included in the one or more genres, computing a score for the genre based on the one or more user preferences and the one or more metadata tags defining in the genre, sorting the subset of genres based on the score associated with each genre included in the subset of genres, and selecting one or more genres from the sorted subset of genres to recommend to the user.

One advantage of the disclosed method is that the take-rate of displayed digital content is increased by displaying digital content associated with genres that are of interest to the user.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
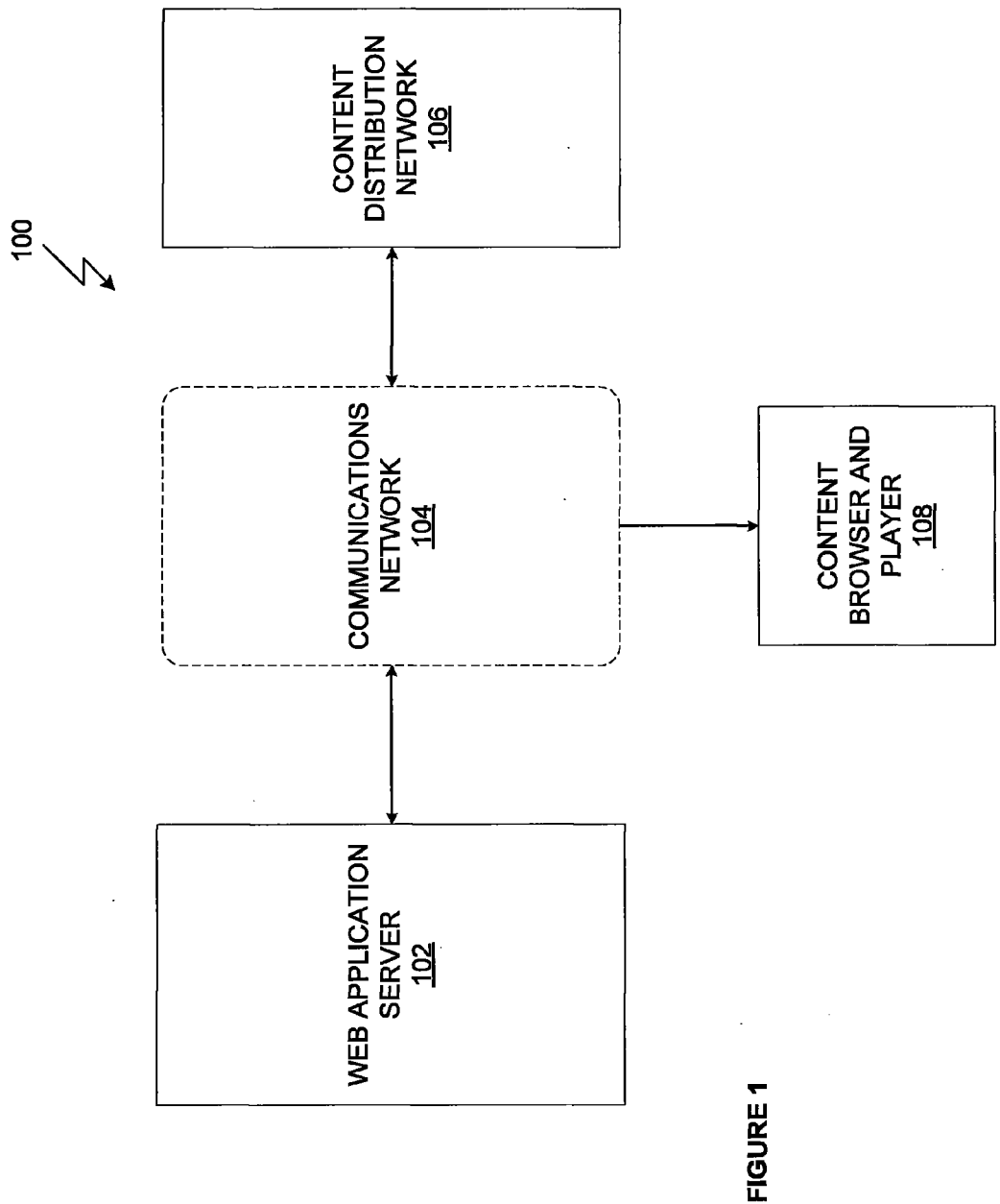
FIG. 1 illustrates a content browsing and distribution system configured to implement one or more aspects of the invention.

FIG. 1 illustrates a content browsing and distribution system 100 configured to implement one or more aspects of the invention. As shown, the content browsing and distribution system 100 includes a web application server 102, a communications network 104, a content distribution network (CDN) 106 and a content browser and player 108.

The communications network 104 includes a plurality of network communications systems, such as routers and switches, configured to facilitate data communication between the web application server 102, the CDN 106 and the content browser and player 108. Persons skilled in the art will recognize that many technically feasible techniques exist for building the communications network 104, including technologies practiced in deploying the well-known internet communications network.

The web application server 102 is a computer system configured to host a web application that is accessed by the content browser and player 108. The web application hosted by the web application server 102 allows a user of content browser and player 108 to browse through available digital content, manage account information, receive content recommendations, etc. One embodiment of the content recommendation functionality, i.e., interest based recommendation, is discussed in greater detail below in conjunction with FIGS. 2-4.

The CDN 106 comprises one or more computer systems configured to serve download requests for digital content files from the content browser and player 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the content server 106 to the content browser and player 108.

The content browser and player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content browser and player 108 interacts with the web application server 102 and the CDN 106 to display available digital content information, gather user preferences and play digital content files.

Although, in the above description, the content browsing and distribution system 100 is shown with one content browser and player 108 and one CDN 106, persons skilled in the art will recognize that the architecture of FIG. 1 contemplates only an exemplary embodiment of the invention. Other embodiments may include any number of content browser and players 108 and/or CDNs 106. Thus, FIG. 1 is in no way intended to limit the scope of the present invention in any way.

Figure 2:
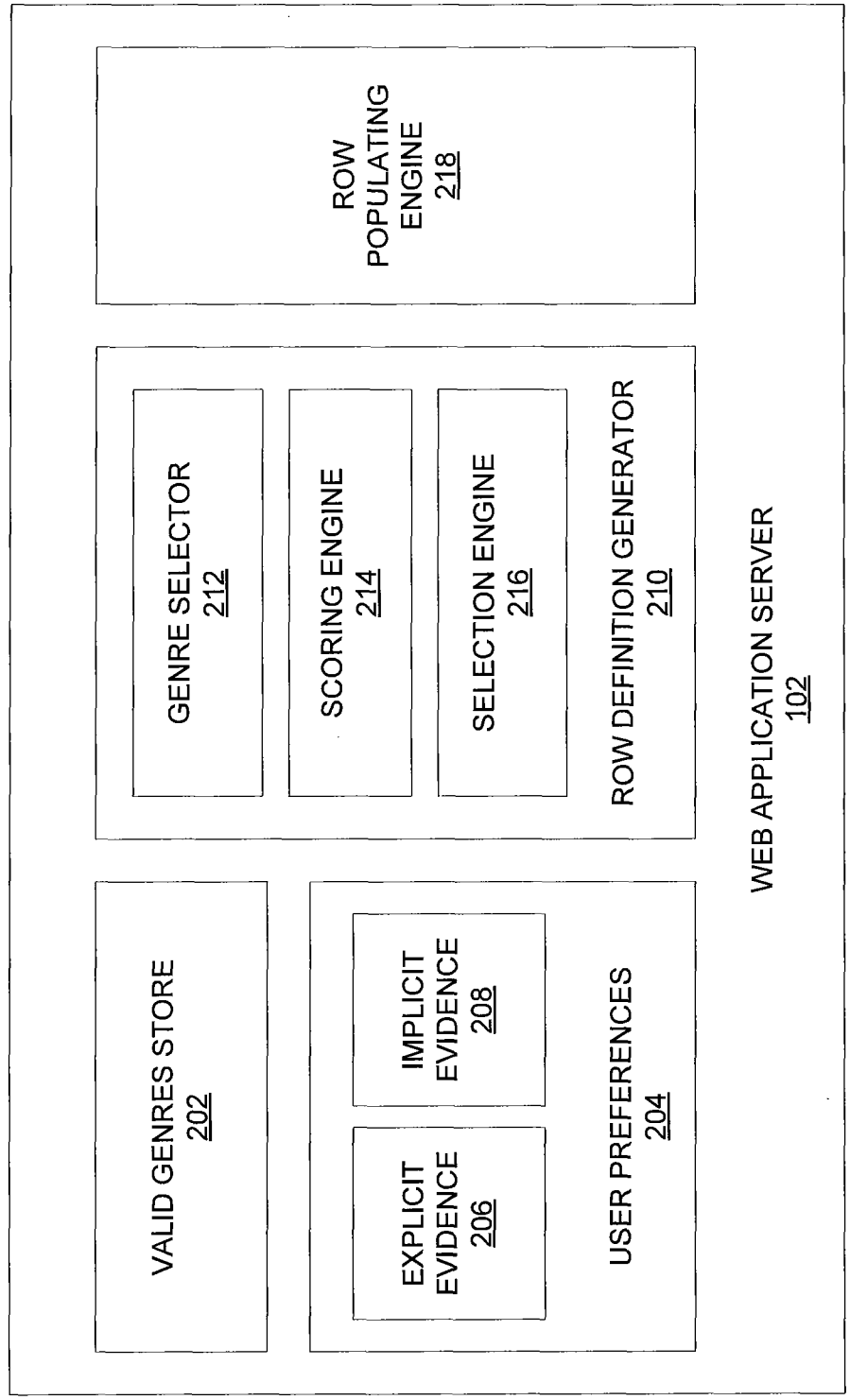
FIG. 2 is a more detailed illustration of the web application server of FIG. 1, according to one embodiment of the invention.

FIG. 2 is a more detailed illustration of the web application server 102 of FIG. 1, according to one embodiment of the invention. As shown, the web application server 102 includes valid genres 202, user preferences 204, a row definition generator 210 and a row population engine 216.

When recommending digital content to the user of the content browser and player 108, the row definition generator 210 determines one or more row definitions that reflect the interests of the user. Each row definition is associated with a set of metadata tags (referred to herein as an "genre") specifying metadata for which the user may have explicitly or implicitly expressed interest. Each metadata tag indicates an attribute of digital content, and each digital content item is associated with one or more metadata tags. As an example, genre A may specify three different metadata tags, "Comedy," "90s," and "Jim Carey," and genre B may specify only two different metadata tags, "Horror" and "Stephen King." Digital content associated with at least the metadata tags "Comedy," "90s," and "Jim Carey" is included in genre A. Similarly, digital content associated with at least the metadata tags "Horror" and "Stephen King" is included in genre B. A particular digital content item may be associated with multiple genres based on the metadata tags associated with the digital content.

Valid genres store 202 stores all the valid genres based on the available metadata tags. In one embodiment, valid genres may be determined by selecting only one metadata tag from each category. For example, for the release date category, an genre may include only the "90s" metadata tag or the "80s" category but not both. In such a manner, only genres that are logically valid are generated and stored in the valid genres store 202.

User preferences 204 include specific metadata tags for which the user of the content browser and player 108 has explicitly or implicitly expressed interest or disinterest. Explicit evidence 206 included in the user preferences 204 specifies a list of metadata tags for which the user has explicitly expressed a negative or positive preference. Explicit evidence is gathered based on the user providing explicit information regarding specific metadata tags. For example, the user may explicitly indicate that the metadata tag "Comedy" is of interest, while the metadata tag "Horror" is not of interest. Implicit evidence 208 included in the user preferences 204 specifies a list of metadata tags for which the user has implicitly expressed a negative or positive preference. Implicit evidence 208 is gathered based on the interactions of the user with digital content associated with specific metadata tags. For example, the user may poorly rate digital content associated with the "Comedy" metadata tag, or the user may repeatedly request digital content with the "Horror" metadata tag. In such a manner, based on the digital content the user has interacted with, a list of metadata tags in which the user is implicitly interested or disinterested is gathered in the implicit evidence 208. In one embodiment, only digital content the user has interacted with in the recent past are used to determine the list of metadata tags in which the user is implicitly interested or disinterested When determining one or more row definitions that reflect the interests of the user, the genre selector 212 first determines two subsets of genres from the valid genres store 202 that are relevant based on the user preferences 204. For each subset of genres, the genre selector 212 selects genres stored in the valid genres store 202 that include one or more metadata tags in which the user has either explicitly or implicitly expressed interest. Specifically, the first subset of genres has genres that include one or more metadata tags in which the user has explicitly expressed interest. Similarly, the second subset of genres has genres that include one or more metadata tags in which the user has implicitly expressed interest.

Once the subsets of genres are determined, the scoring engine 214 computes a score associated with each genre included in the subsets of genres. The scoring mechanism implemented by the scoring engine 214 is based on scoring each metadata tag included in a given genre and combining the scores of the different metadata tags included in the given genre to compute a score for the given genre. A few examples of scoring algorithms used by the scoring engine 214 to compute such a score for the given genre are described herein. However, any technically feasible scoring algorithm for computing such a score for the given genre is contemplated by the current invention.

In one embodiment, if a metadata tag included in the given genre was specified by the explicit evidence 206, then the scoring engine 214 gives the metadata tag a score of 1 when the user has a positive preference for the metadata tag, a score of 0 when the user has a neutral preference for the metadata tag and a score of −1 when the user has a negative preference for the metadata tag. In an alternate embodiment, if the user has a negative preference for the metadata tag, then the scoring engine 214 gives the metadata tag a score of negative infinity.

Similarly, if a metadata tag included in the given genre was specified by the implicit evidence 208, then the scoring engine 214 gives the metadata tag a score of 1 when the user has interacted positively with a digital content item associated with the metadata tag, a score of 0 when the user has interacted neutrally with a digital content item associated with the metadata tag and a score of −1 when the user has interacted negatively with a digital content item associated with the metadata tag. In an alternate embodiment, if the user has interacted negatively with a digital content item associated with the metadata tag, then the scoring engine 214 gives the metadata tag a score of negative infinity. A positive interaction with a digital content item associated with the metadata tag may be determined based on a high rating given by the user to the digital content item. Similarly, a negative interaction with a digital content item associated with the metadata tag may be determined based on a low rating given by the user to the digital content item.

Once each of the metadata tags included in the given genre is scored, the scoring engine 214 combines the scores in any technically feasible fashion to compute the overall score of the given genre. In one embodiment, the scores of the metadata tags included in the given genre are summed to compute the overall score of the given genre. In an alternate embodiment, the scores of the metadata tags included in the given genre are first weighted based on different criteria and then summed to compute the overall score of the given genre. The score of a metadata tag may be weighted based on the category of the metadata tag or whether the user had a positive preference for the metadata tag or a negative preference for the metadata tag. For example, a metadata tag with a positive preference may be given a larger weight than a metadata tag with a negative preference. In an alternate embodiment, the overall score of the given genre may be further modified based on other criteria. For example, the score of an genre with multiple metadata tags is given a higher score than an genre with only one metadata tag. Further, an genre that has been recently displayed to the user may be penalized, i.e., given a lowered score, in order to promote fresh row definition selection between different user sessions.

After a score is computed for each genre included in the subsets of genres by the scoring engine 214, the selection engine 216 sorts genres included in the subsets of genres based on the associated scores. In one embodiment, a tie between genres may be resolved by assigning a higher score to the genre with more metadata tags. To select genres for display to the user, the selection engine 216 selects a pre-determined number of genres from the sorted subset of genres determined based on the explicit evidence 206 and pre-determined number of genres from the sorted subset of genres determined based on the implicit evidence 208. In one embodiment, the genres in the sorted subsets of genres are further selected such that the number of duplicated metadata tags among the selected genres is minimized.

Once the genres to be displayed are selected by the selection engine 216, the row populating engine 218 determines the specific digital content associated with the selected genres for display to the user. The selected genres and the corresponding digital content are then displayed within the content browser and player 108.

Figure 3:
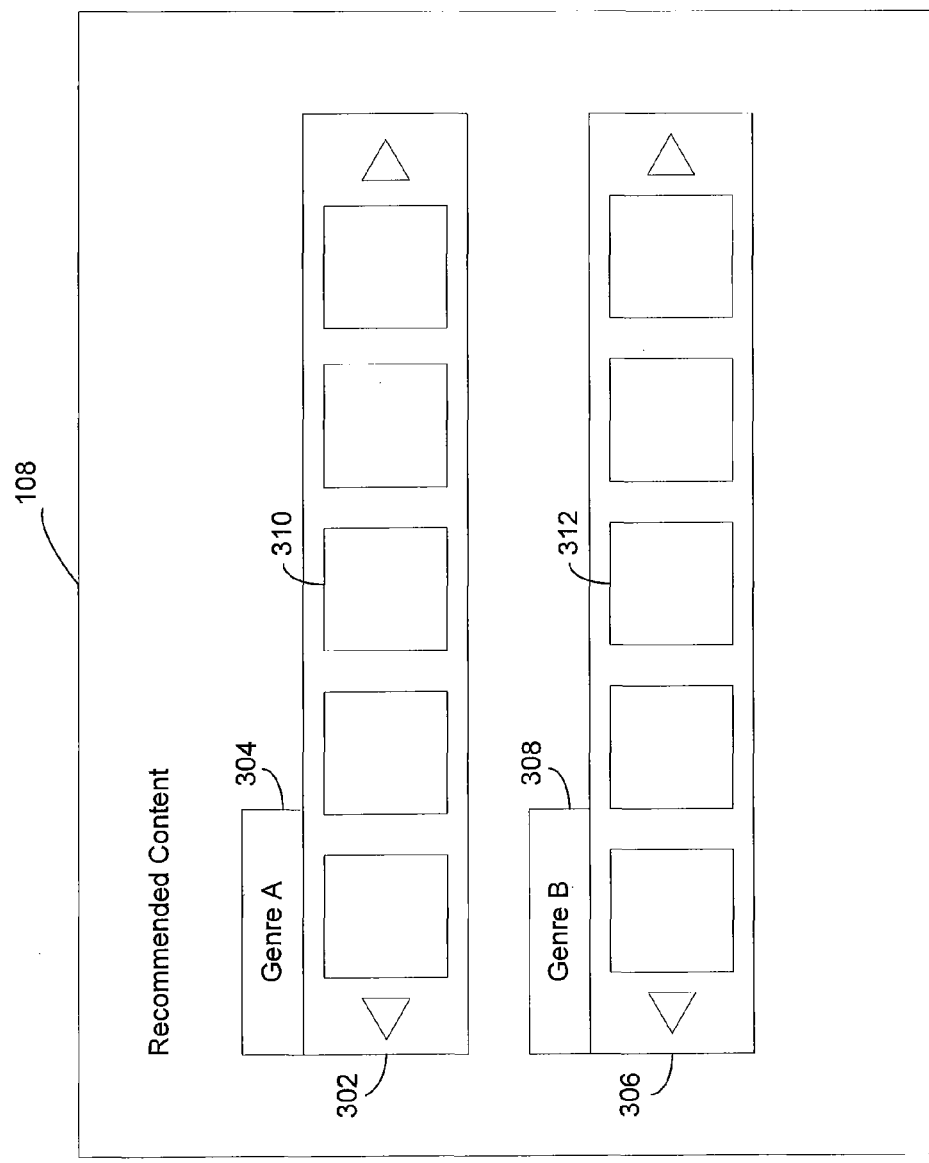
FIG. 3 is a conceptual diagram illustrating recommended genres displayed in the content browser and player of FIG. 1, according to one embodiment of the invention.

FIG. 3 is a conceptual diagram illustrating recommended genres displayed in content browser and player 108 of FIG. 1, according to one embodiment of the invention. As shown, the content browser and player 108 includes row 302 associated with genre 304 and row 306 associated with genre 308. Each of genre 304 and genre 308 is recommended to the user of the content browser and player 108 based on user preferences 204 as determined by the row definition generator 210. Row 302 includes digital content, such as digital content 310, that is associated with metadata tags included in the genre 304. Similarly, row 306 includes digital content, such as digital content 312, that is associated with metadata tags included in the genre 308.

Figure 4:
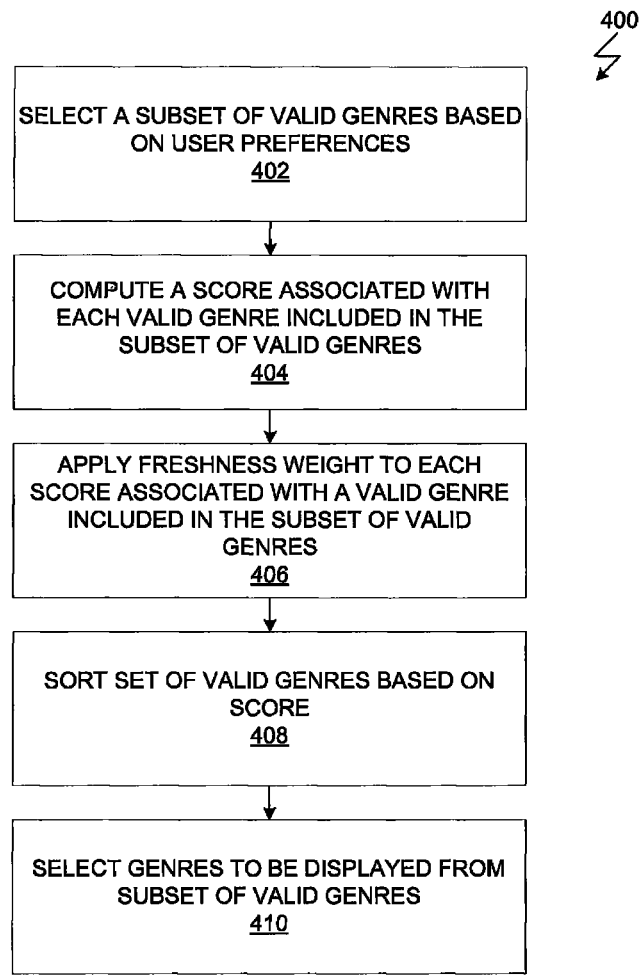
FIG. 4 is a flow diagram of method steps for identifying one or more genres to display to a user, according to one embodiment of the invention.

FIG. 4 is a flow diagram of method steps for identifying one or more genres to display to a user, according to one embodiment of the invention. Although the method steps are described in conjunction with the systems for FIGS. 1-3, persons skilled in the art will understand that any system configured to perform the method steps, in any order, is within the scope of the invention.

The method 400 begins at step 402, where the genre selector 212 selects a subset of valid genres from the valid genres 202 based on the user preferences 204. The subset of valid genres may have genres that include one or more metadata tags in which the user has explicitly expressed interest or one or more metadata tags in which the user has implicitly expressed interest.

At step 404, the scoring engine 404 computes a score associated with each genre included in the subset of genres. The scoring mechanism implemented by the scoring engine 214 is based on scoring each metadata tag included in a given genre and combining the scores of the different metadata tags included in the given genre to compute a score for the given genre.

At step 406, the scoring engine 404 applies a freshness weight to each score associated with an genre included in the subset of genres. The freshness weight penalizes an genre that has been recently displayed to the user in order to promote fresh row definition selection between different user sessions.

At step 408, the selection engine 216 sorts genres included in the subset of genres based on the associated scores. At step 410, to select genres for display to the user, the selection engine 216 selects a pre-determined number of genres from the sorted subset of genres such that digital content associated with the selected genres is displayed to the user.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for recommending one or more genres of digital content items to a user, the method comprising:
    receiving one or more user preferences that reflect at least one attribute associated with one or more of the digital content items;
    determining at least one user preference tag based on the at least one attribute, wherein the at least one user preference tag comprises metadata reflective of the at least one attribute;
    identifying a subset of the one or more genres included within a set of genres reflective of the one or more user preferences by comparing, for each genre in the set of genres, the at least one user preference tag to one or more of the plurality of metadata tags defining the genre, wherein, for each genre in the subset of the one or more genres, the at least one user preference tag matches one of the one or more of the plurality of metadata tags defining the genre;
    for each genre included in the subset of the one or more genres, computing a score for the genre based on the one or more user preferences and the one or more of the plurality of metadata tags defining the genre, wherein the step of computing the score for the genre comprises:
        computing an individual tag score for each of the plurality of metadata tags defining the genre, and
        combining a plurality of the individual tag scores of the plurality of metadata tags defining the genre;
    sorting the subset of genres based on the score associated with each genre included in the subset of genres; and
    selecting one or more genres from the sorted subset of genres to recommend to the user.

2. The method of claim 1, further comprising determining the one or more user preferences based on interactions of the user with digital content associated with the at least one user preference tag.

3. The method of claim 2, wherein the individual score of the at least one user preference tag is based on a number of times the user has interacted with the digital content associated with the at least one user preference tag.

4. The method of claim 2, wherein the individual score of the at least one user preference tag is based on ratings given by the user to the digital content associated with the at least one user preference tag.

5. The method of claim 1, wherein the step of combining the individual scores comprises weighting the individual scores based on the one or more user preferences.

6. The method of claim 5, wherein the individual score of the at least one user preference tag is given a higher weight when the one or more user preferences indicate a positive preference for the at least one user preference tag.

7. The method of claim 5, wherein the individual score of the at least one user preference tag is given a lower weight when the one or more user preferences indicate a negative preference for the at least one user preference tag.

8. The method of claim 1, wherein the step of computing the score for each genre comprises increasing the score for the genre if the genre is defined by a number of metadata tags more than a pre-determined threshold.

9. The method of claim 1, wherein the step of computing the score for each genre comprises decreasing the score for the genre if the genre has been previously recommended to the user.

10. The method of claim 1, wherein the step of computing the score for each genre is further based on explicit evidence indicating that the user has a negative preference or a positive preference for at least one of the plurality of metadata tag defining the genre.

11. A non-transitory computer-readable storage medium including instructions that, when executed by a computer processor, cause the computer processor to recommend one or more genres of digital content items to a user, by:
 receiving one or more user preferences that reflect at least one attribute associated with one or more of the digital content items;
 determining at least one user preference tag based on the at least one attribute, wherein the at least one user preference tag comprises metadata reflective of the at least one attribute;
 identifying a subset of the one or more genres included within a set of genres reflective of the one or more user preferences by comparing, for each genre in the set of genres, the at least one user preference tag to one or more of the plurality of metadata tags defining the genre, wherein, for each genre in the subset of the one or more genres, the at least one user preference tag matches one of the one or more of the plurality of metadata tags defining the genre;
 for each genre included in the subset of the one or more genres, computing a score for the genre based on the one or more user preferences and the one or more of the plurality of metadata tags defining the genre, wherein the step of computing the score for the genre comprises:
  computing an individual tag score for each of the plurality of metadata tags defining the genre, and
  combining a plurality of individual tag scores of the plurality of metadata tags defining the genre;
 sorting the subset of genres based on the score associated with each genre included in the subset of genres; and
 selecting one or more genres from the sorted subset of genres to recommend to the user.

12. The computer-readable storage medium of claim 11, further comprising determining the one or more user preferences based on interactions of the user with digital content associated with the at least one user preference tag.

13. The computer-readable storage medium of claim 12, wherein the individual score of the at least one user preference tag is based on a number of times the user has interacted with the digital content associated with the at least one user preference tag.

14. The computer-readable storage medium of claim 12, wherein the individual score of the at least one user preference tag is based on ratings given by the user to the digital content associated with the at least one user preference tag.

15. The computer-readable storage medium of claim 11, wherein the step of combining the individual scores comprises weighting the individual scores based on the one or more user preferences.

16. The computer-readable storage medium of claim 15, wherein the individual score of the at least one user preference tag is given a higher weight when the one or more user preferences indicate a positive preference for the at least one user preference tag.

17. The computer-readable storage medium of claim 15, wherein the individual score of the at least one user preference tag is given a lower weight when the one or more user preferences indicate a negative preference for the at least one user preference tag.

18. A computing device for recommending one or more genres of digital content items to a user, comprising:
 a computer memory; and
 a computer processor configured to execute instructions stored in the computer memory and to:
  receive one or more user preferences that reflect at least one attribute associated with one or more of the digital content items;
  determine at least one user preference tag based on the at least one attribute, wherein the at least one user preference tag comprises metadata reflective of the at least one attribute;
  identify a subset of the one or more genres included within a set of genres reflective of the one or more user preferences by comparing, for each genre in the set of genres, the at least one user preference tag to one or more of the plurality of metadata tags defining the genre, wherein, for each genre in the subset of the one or more genres, the at least one user preference tag matches one of the one or more of the plurality of metadata tags defining the genre;
  for each genre included in the subset of the one or more genres, compute a score for the genre based on the one or more user preferences and the one or more of the plurality of metadata tags defining the genre, wherein the step of computing the score for the genre comprises:
   computing an individual tag score for each of the plurality of metadata tags defining the genre, and
   combining a plurality of individual tag scores of the plurality of metadata tags defining the genre;
  sort the subset of genres based on the score associated with each genre included in the subset of genres; and
  select one or more genres from the sorted subset of genres to recommend to the user.

* * * * *